(12) United States Patent
Howarter et al.

(10) Patent No.: US 8,538,408 B2
(45) Date of Patent: *Sep. 17, 2013

(54) SYSTEM AND METHOD FOR CONTROLLING VEHICLE SYSTEMS FROM A CELL PHONE

(75) Inventors: Jamie C. Howarter, Denver, CO (US); Richard G. Bradford, Kansas City, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,856

(22) Filed: Apr. 20, 2012

(65) Prior Publication Data

US 2012/0208520 A1 Aug. 16, 2012

Related U.S. Application Data

(63) Continuation of application No. 12/237,122, filed on Sep. 24, 2008, now Pat. No. 8,224,313.

(51) Int. Cl.
*H04M 3/00* (2006.01)

(52) U.S. Cl.
USPC .......................................................... 455/420

(58) Field of Classification Search
USPC .......................................................... 455/420
See application file for complete search history.

(56) References Cited

U.S. PATENT DOCUMENTS

| | | | |
|---|---|---|---|
| 5,146,215 A | 9/1992 | Drori | |
| 5,386,713 A | 2/1995 | Wilson | |
| 5,513,244 A | 4/1996 | Joao et al. | |
| 5,673,948 A | 10/1997 | Karpisek | |
| 5,693,987 A | 12/1997 | Krucoff | |
| 5,712,969 A | 1/1998 | Zimmerman et al. | |
| 5,768,539 A | 6/1998 | Metz et al. | |
| 5,790,015 A * | 8/1998 | Iitsuka ..................... | 340/426.28 |
| 5,801,753 A | 9/1998 | Eyer et al. | |
| 5,852,944 A | 12/1998 | Collard, Jr. et al. | |
| 5,894,320 A | 4/1999 | Vancelette | |
| 5,931,908 A | 8/1999 | Gerba et al. | |
| 5,937,065 A | 8/1999 | Simon et al. | |
| 5,940,072 A | 8/1999 | Jahanghir et al. | |

(Continued)

FOREIGN PATENT DOCUMENTS

| JP | 09-125768 | * | 5/1997 |
|---|---|---|---|
| JP | 2008-112241 A | * | 5/2008 |
| JP | 20081122441 A | | 5/2008 |

OTHER PUBLICATIONS

U.S. Appl. No. 12/237,149; Issue Notification dated Feb. 8, 2012; 1 page.

(Continued)

*Primary Examiner* — Nathan Mitchell

(74) *Attorney, Agent, or Firm* — Swanson & Bratschun, L.L.C.

(57) ABSTRACT

A system and method for controlling systems of a vehicle with a cell phone. The cell phone is associated with the vehicle through a user interface. User preferences are received through the user interface for sending commands from the cell phone to the vehicle for controlling the systems of the vehicle. A wireless connection is established between the vehicle and the cell phone. A distance is determined between the cell phone and the vehicle. One or more commands are sent to the vehicle to control the systems based on the user preferences.

20 Claims, 7 Drawing Sheets

(56) References Cited

U.S. PATENT DOCUMENTS

| | | | |
|---|---|---|---|
| 5,960,445 | A | 9/1999 | Tamori et al. |
| 5,978,855 | A | 11/1999 | Metz et al. |
| 6,040,851 | A | 3/2000 | Cheng et al. |
| 6,046,760 | A | 4/2000 | Jun |
| 6,075,863 | A | 6/2000 | Krishnan et al. |
| 6,088,051 | A | 7/2000 | Barraud |
| 6,138,271 | A | 10/2000 | Keeley |
| 6,163,251 | A | 12/2000 | Escareno et al. |
| 6,175,861 | B1 | 1/2001 | Williams, Jr. |
| 6,195,797 | B1 | 2/2001 | Williams, Jr. |
| 6,202,211 | B1 | 3/2001 | Williams, Jr. |
| 6,246,434 | B1 | 6/2001 | Takashima |
| 6,256,785 | B1 | 7/2001 | Klappert et al. |
| 6,259,443 | B1 | 7/2001 | Williams, Jr. |
| 6,331,876 | B1 | 12/2001 | Koster et al. |
| 6,347,294 | B1 | 2/2002 | Booker et al. |
| 6,424,947 | B1 | 7/2002 | Tsuria et al. |
| 6,469,742 | B1 | 10/2002 | Trovato et al. |
| 6,480,098 | B2 | 11/2002 | Flick |
| 6,614,470 | B1 | 9/2003 | Manowitz et al. |
| 6,618,754 | B1 | 9/2003 | Gosling |
| 6,624,758 | B1 | 9/2003 | Omata et al. |
| 6,637,029 | B1 | 10/2003 | Maissel et al. |
| 6,654,835 | B1 | 11/2003 | Foster et al. |
| 6,681,393 | B1 | 1/2004 | Bauminger et al. |
| 6,684,403 | B1 | 1/2004 | Barraud |
| 6,690,259 | B2 | 2/2004 | Aslanidis et al. |
| 6,717,511 | B2 | 4/2004 | Parker et al. |
| 6,895,595 | B2 | 5/2005 | Goodman et al. |
| 6,907,252 | B2 | 6/2005 | Papadias et al. |
| 6,917,801 | B2 | 7/2005 | Witte et al. |
| 6,956,467 | B1 | 10/2005 | Mercado, Jr. |
| 6,970,641 | B1 | 11/2005 | Pierre et al. |
| 6,978,152 | B1 | 12/2005 | Yamaashi et al. |
| 7,003,783 | B2 | 2/2006 | Skaringer et al. |
| 7,027,768 | B2 | 4/2006 | Hill |
| 7,042,516 | B2 | 5/2006 | Moriya et al. |
| 7,069,578 | B1 | 6/2006 | Prus et al. |
| 7,072,950 | B2 | 7/2006 | Toft |
| 7,124,194 | B2 | 10/2006 | Nathan et al. |
| 7,200,683 | B1 | 4/2007 | Wang et al. |
| 7,383,056 | B2 * | 6/2008 | Matsubara et al. ............ 455/521 |
| 7,437,183 | B2 * | 10/2008 | Makinen .................... 455/569.1 |
| 7,502,687 | B2 * | 3/2009 | Flick ............................. 701/487 |
| 7,623,949 | B2 * | 11/2009 | Nou ............................. 701/31.4 |
| 7,683,757 | B2 | 3/2010 | King et al. |
| 7,725,077 | B2 * | 5/2010 | Jung et al. ..................... 455/41.2 |
| 7,796,965 | B2 | 9/2010 | Moser et al. |
| 7,893,818 | B2 | 2/2011 | Smoyer et al. |
| 8,126,450 | B2 | 2/2012 | Howarter et al. |
| 8,224,313 | B2 | 7/2012 | Howarter et al. |
| 2002/0164973 | A1 | 11/2002 | Janik et al. |
| 2003/0100299 | A1 | 5/2003 | Ko et al. |
| 2004/0100368 | A1 | 5/2004 | Lobaza et al. |
| 2004/0203345 | A1 | 10/2004 | Tehrani |
| 2004/0242198 | A1 * | 12/2004 | Oyagi et al. .................. 455/411 |
| 2005/0083211 | A1 | 4/2005 | Shafir et al. |
| 2006/0004788 | A1 | 1/2006 | Pilgrim et al. |
| 2007/0005201 | A1 | 1/2007 | Chenn |
| 2007/0085658 | A1 | 4/2007 | King et al. |
| 2007/0222638 | A1 | 9/2007 | Chen et al. |
| 2008/0034422 | A1 | 2/2008 | Al-Azzawi |
| 2008/0176537 | A1 | 7/2008 | Smoyer et al. |
| 2010/0075655 | A1 | 3/2010 | Howarter et al. |
| 2010/0240307 | A1 * | 9/2010 | Sims et al. ................... 455/41.3 |

OTHER PUBLICATIONS

U.S. Appl. No. 11/656,708; Issue Notification dated Feb. 2, 2011; 1 page.
U.S. Appl. No. 11/656,708; Final Rejection dated Sep. 29, 2009; 14 pages.
U.S. Appl. No. 11/656,708; Non-Final Rejection dated Apr. 1, 2009_8 pages.
U.S. Appl. No. 11/656,708; Notice of Allowance dated Oct. 14, 2010; 10 pages.
U.S. Appl. No. 11/656,708;Non-Final Rejection dated Jun. 23, 2010; 11 pages.
U.S. Appl. No. 12/237,122; Final Rejection dated Jun. 8, 2011; 9 pages.
U.S. Appl. No. 12/237,122; Issue Notification dated Jun. 27, 2012; 1 page.
U.S. Appl. No. 12/237,122; Non-Final Rejection dated Oct. 11, 2011; 6 pages.
U.S. Appl. No. 12/237,122; Non-Final Rejection dated Dec. 23, 2010; 16 pages.
U.S. Appl. No. 12/237,122; Notice of Allowance dated Jan. 26, 2012; 7 pages.
U.S. Appl. No. 12/237,149; Non-Final Rejection dated Dec. 9, 2010; 24 pages.
U.S. Appl. No. 12/237,149; Notice of Allowance dated Oct. 13, 2011; 10 pages.
U.S. Patent No. 8,126,450 B2; Original Letters Patent dated Feb. 28, 2012; 17 pages.
U.S. Patent No. 7,893,818 B2; Original Letters Patent dated Feb. 22, 2011; 10 pages.
U.S. Patent No. 8,224,313 B2; Original Letters Patent dated Jul. 17, 2012; 17 pages.

* cited by examiner

FIG. 5

GUI 500

| | Truck | Van |
|---|---|---|
| Select number of vehicles 502 | 2 ▼ | Add a vehicle 506 |
| Enter activation distance 504 | 30 Feet ▼ | Active Vehicle 508 — Truck ▼ |
| Select lock command 510 | Truck — Double-tap ▼ | Van — Proximity detection ▼ |
| Select unlock command 512 | Truck — Double-tap ▼ | Van — Double tap and Proximity detection ▼ |
| Select truck unlock command 514 | Truck — None ▼ | Van — *99 ▼ |
| Select driver's door unlock command 516 | Truck — Single-tap ▼ | Van — Single-tap ▼ |
| Select passenger door unlock command 518 | Truck — Triple-tap ▼ | Van — Triple-tap ▼ |
| Select turn on lights command 520 | Truck — Voice-activated ▼ | Van — Voice-activated ▼ |
| Select panic command 522 | Truck — Push-button ▼ | Van — Push-button ▼ |
| Select vehicle start command 524 | Truck — Voice-activated ▼ | Van — Dedicated button ▼ |
| Select command confirmation 526 | Truck — Vibration ▼ | Van — Ring tone ▼ |
| Automatic relock interval 528 | Truck — 30 s ▼ | Van — 50 s ▼ |

☑ On    ☐ Off

FIG. 6

| | User Interface 600 | |
|---|---|---|
| | Configure Jane's Options | |
| Proximity selections: | ☐ Approaching vehicle <u>40 feet</u><br>    ☐ Adjust seat and mirrors to setting 2<br>    ☐ Turn on lights<br>☑ Approaching vehicle <u>10 feet</u><br>    ☐ Unlock: drivers side door and rear doors<br>    ☐ Open sliding door<br>☐ Leaving vehicle <u>20 feet</u><br>    ☐ Lock doors and set security system | 602 |
| Voice command programming: | ☐ Lock doors    ☐ Unlock all<br>☐ Open trunk    ☐ Lower running boards<br>☐ Open kid's doors    ☐ Television on<br>☑ Enter new command and speak command | 604 |
| Media selections: | ☐ Turn on rear TV to DVD if inserted or <u>channel 60</u>.<br>☑ Turn radio to <u>country 1</u> and switch to Jane's preset station programming | 606 |
| Environment selections: | ☐ Activate wipers upon entry if it is raining<br>☐ Adjust temperature to <u>72</u> if temperature is <u>greater than 80 or less than 64</u> | 608 |
| Priority selections: | ☑ Give Jane first priority<br>☐ Give Fred first priority | 610 |

FIG. 7

| User Interface | 700 |
|---|---|

| 702 | Fred's options |
|---|---|
| Proximity options: | Within 50 feet of entry start vehicle, adjust seat and mirrors to position 1. Unlock driver side door at 10 feet. Past 10 feet when exiting vehicle lock vehicle doors and activate security system. |
| 704<br>Programmed voice commands: | Lock doors, open trunk, open Jane's door, unlock all doors. |
| 706<br>Media options: | Automatically turn radio on to news station one and switch from Jane's presets to Fred's |
| 708<br>Environment settings: | If raining activate wipers upon entry, automatically adjust temperature of car to 70 degrees. |
| 710<br>Priority settings: | If Jane and Fred signals both detected initiate Fred's preferences as driver and receive secondary commands from Jane |

SYSTEM AND METHOD FOR CONTROLLING VEHICLE SYSTEMS FROM A CELL PHONE

CROSS REFERENCE TO RELATED APPLICATION

This application is a continuation of application Ser. No. 12/237,122 (the "122 application"), filed Sep. 24, 2008 by Jamie C. Howarter et al, and entitled, "System and Method for Controlling Vehicle Systems from a Cell Phone" which is hereby incorporated by reference in its entirety.

BACKGROUND

The use of and development of communications has grown nearly exponentially in recent years. The growth is fueled by larger networks with more reliable protocols and better communications hardware available to service providers and consumers. With some exceptions, technological advancements for the vehicle and transportation fields have been similarly fast paced.

In contrast, remote keyless entry systems first began appearing around 1983 and gained widespread availability and popularity in the following decades. The systems typically utilize an electronic key fob to control basic functions of a vehicle, such as locks, alarms, and trunk access. The fundamental design and operation of remote keyless systems has not changed significantly since their introduction despite the usefulness of these features.

SUMMARY

One embodiment includes a system and method for controlling systems of a vehicle with a cell phone. The cell phone may be associated with the vehicle through a user interface. User preferences may be received through the user interface for sending commands form the cell phone to the vehicle for controlling the systems of the vehicle. A wireless connection may be established between the vehicle and the cell phone. A distance may be determined between the cell phone and the vehicle. One or more commands may be sent to the vehicle to control the systems based on the user preferences.

Another embodiment includes a cell phone for controlling systems of a vehicle. The cell phone may include a transceiver operable to wirelessly communicate with a vehicle system. The transceiver may be further operable to determine a distance between the cell phone and the vehicle system. The cell phone may further include a user interface in communication with the transceiver. The user interface may be operable to receive user input. The user interface may be further operable to receive user preferences linking one or more commands with one or more actions of the vehicle system. The cell phone may further include control logic in communication with the user interface operable to convert the user input to one of the one or more commands. The transceiver may communicate the one or more commands to the vehicle system to control the systems of the vehicle.

Yet another embodiment includes a cell phone for controlling a vehicle system. The cell phone may include a processor for executing a set of instructions and a memory for storing the set of instructions. The set of instructions may be configured when executed by the processor to associate the cell phone with the vehicle through a user interface, receive user preferences through the user interface for sending commands from the cell phone to the vehicle for controlling systems of the vehicle, establish a wireless connection between the vehicle and the cell phone, determine a distance between the cell phone and the vehicle, send one or more of the commands to the vehicle to control the systems based on the user preferences, and display a status of the vehicle to the user interface of the cell phone.

BRIEF DESCRIPTION OF THE DRAWINGS

Illustrative embodiments of the present invention are described in detail below with reference to the attached drawing figures, which are incorporated by reference herein and wherein:

FIG. 5 is a pictorial representation of a graphical user interface in accordance with an illustrative embodiment;

FIG. 6 is a pictorial representation of a user interface for a cell phone in accordance with an illustrative embodiment; and FIG. 7 is a pictorial representation of a user interface in accordance with an illustrative embodiment.

DETAILED DESCRIPTION OF THE DRAWINGS

Illustrative embodiments provide a system and method for controlling systems of a vehicle remotely utilizing a wireless device. The systems of the vehicle may be controlled passively based on the location and direction of travel of a user carrying a cell phone associated with a vehicle, based on active user selections through the cell phone, or utilizing passive determinations and active user selections. Managing control of the vehicle may be performed between a cell phone and a vehicle system with the computing, determinations, and communications performed by either or both devices/systems.

Figure 1:
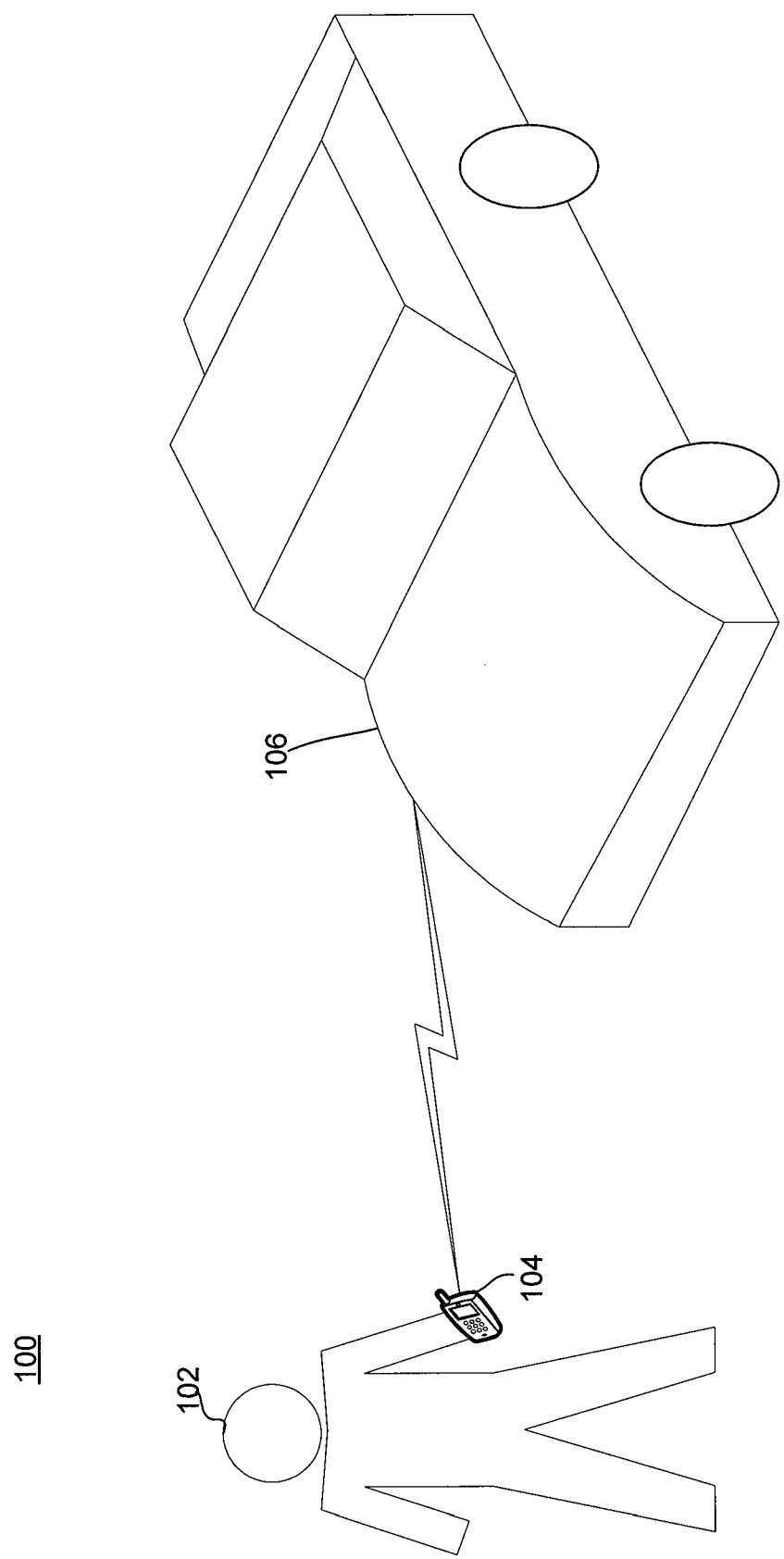
FIG. 1 is a pictorial representation of a wireless environment in accordance with an illustrative embodiment.

FIG. 1 is a pictorial representation of a wireless environment 100 in accordance with an illustrative embodiment. The wireless environment 100 is one embodiment of a location, area, building, or other settings in which the communication and control features, as herein described, may be implemented. In one embodiment, the wireless environment 100 may include a user 102, a cell phone 104, and a vehicle 106. The user 102 is the person, individual, or group in control of the cell phone 104. The user 102 may operate the cell phone 104 and the vehicle 106 at the user's discretion. For example, the user 102 may travel in the vehicle 106, park the vehicle 106, and otherwise enter, operate, and leave the vehicle 106 at any number of locations and time periods during the day.

The cell phone 104 is a device configured for wireless communications. The cell phone 104 may communicate with the vehicle 106 utilizing any number of transmission signals, protocols, or standards. For example, the cell phone 104 may communicate utilizing Bluetooth®, WiFi™, TDMA, CDMA, GSM, WiMAX, analog signals, or any number of other communications standards. The cell phone 104 is one embodiment of a wireless device. In another embodiment, the cell phone 104 may be a digital personal assistant (PDA), Blackberry® device, mp3 player, laptop, evolution data optimized (EVDO) card, or other electronic and/or voice communications device suitable for wireless communications with the vehicle 106. In one embodiment, the wireless device enables data or voice communications with one or more users directly or through a network in addition to the vehicle 106.

The cell phone 104 and the vehicle 106 may communicate through long range or short range cellular, data, or packet signals. For example, the cell phone 104 may receive status updates whenever the vehicle is started by displaying a message, playing a ring tone, or playing a verbal message. In another embodiment, the vehicle 106 may send a text message detailing the status or user controlled vehicle actions, such as starting the engine, unlocking the doors, deactivating the alarm, or other similar activities. In one embodiment, the cell phone 104 and the vehicle 106 may utilize communications services available through one or more networks operated by a communications service provider.

The vehicle 106 is a transportation device or element. In one embodiment, the vehicle 106 may be a car, truck, bus, airplane, boat, scooter, motorcycle, bicycle, or other transportation device, mechanism, or element suitable for transporting the user 102 from one location to another. The cell phone 104 and the vehicle 106 may include hardware, software, and firmware configured for communication between the two devices. The cell phone 104 may be configured to control features, functions, or systems of the vehicle 106 automatically, based on preset user preferences, configurations, options, or based on user input received in real-time, or based on a combination of passive input automatically determined by the cell phone 104 and/or the vehicle 106 and user input actively received from the user 102.

In one embodiment, the user may select passive, active or a combination of pass and active actions and criteria for controlling the features of the vehicle 106. The vehicle 106 may include a computer, global positioning system (GPS), stereo, user interface, computing system, or other vehicle elements configured to communicate with the cell phone 104. A centralized system of the vehicle 106 may control any number of vehicle systems including locks, lights, temperature controls, engine start and stop control, alarm systems, entertainment systems, trunk controls, environmental controls, OnStar®, and any number of other public or proprietary systems, elements, or devices that may be integrated with or in communication with the vehicle 106.

In one embodiment, the vehicle system includes a GPS or other navigation systems. The GPS may be utilized to determine the location of the vehicle 106. The GPS may also receive data or information from the cell phone 104 in order to determine the location and direction of travel of the cell phone and an associated user. The GPS may also be configured to determine the exact or approximate distance between the cell phone 104 and the vehicle 106. In one embodiment, the cell phone 104 and vehicle 106 may use a short-range wireless signal, such as Bluetooth® or WiFi® to communicate. The user 102 or another vehicle administrator may be required to configure the cell phone 104 and vehicle 106 to communicate. The user 102 may be required to link the communications system of the cell phone 104 and the vehicle 106 for communication. For example, a unique identifier for both the cell phone 104 and the vehicle 106 may be registered with each of the devices respectively to enable secure communications. The identifier may include a vehicle identification number (VIN), user account number, user name, password, IP address, wireless identification, or other suitable identifier. The communication system of the vehicle 106 may be configured to automatically poll, monitor, or search for a wireless signal from the cell phone 104. In response to detecting the cell phone 104, the vehicle systems may take any number of actions.

In one embodiment, the vehicle 106 may determine whether the cell phone 104 is nearing or becoming further separated from the vehicle 106. In one embodiment, the distance between the cell phone 104 and the vehicle 106 may be determined based on the signal strength of the link or communications between the two devices. For example, a signal strength scale of between 1 and 100 may be converted into an approximate distance based on pre-set determinations, calibrations, or programming. At a threshold distance, the vehicle 106 may be configured to unlock the doors, reconfigure seats, and otherwise prepare the vehicle for use by the user 102. The user 102 may utilize a user interface of the vehicle 106 or the cell phone 104 in order to program the features or steps that are taken by the vehicle 106 in response to detecting the presence of the cell phone 104 within or past one or more distance thresholds. For example, the user 102 may commonly approach the vehicle 106 at night and may configure the settings of the cell phone 104 and/or vehicle 106 to automatically turn on the lights of the vehicle 106, an internal cabin light, and unlock only the driver's side door in response to detecting the cell phone is within one hundred feet of the user.

Similarly, the vehicle 106 may be configured to take different actions based on one or more cell phones that are linked with the vehicle 106. For example, in response to detecting a first cell phone associated with a first user is within fifty feet of the vehicle 106, the driver's side door may be unlocked, the seat adjusted to a first position, and the engine may be started. In response to detecting a second cell phone within forty feet of the vehicle, all of the vehicles locks may be unlocked, the seat may be adjusted to a second position, and within ten feet one or more doors may be automatically opened.

In another embodiment, the vehicle 106 may be configured to deactivate an alarm system and prepare the trunk to be opened based on determining the user is within a threshold distance. The vehicle 106 may also prepare to receive an additional user selection or user input from the cell phone 104 in response to detecting a communications signal from the cell phone 104. For example, the vehicle 106 may enter an active listening mode in which a voice command, tactile input, or button sequence may be received as a user input through the cell phone 104. The user input may be a command that controls the features and systems of the vehicle 106. In one embodiment, the user 102 may be required to enter a button sequence to unlock one or more doors of the vehicle 106, such as *11 for the driver's side door, *22 for the passenger side door, *10 for all doors, and *99 for the trunk.

In another embodiment, buttons, switches, scroll wheels, soft keys, hard keys, portions of a touch screen, or other interactive elements or user input may be configured to control distinct systems or features of the vehicle 106. For example, a tactile response of tapping the cell phone 104 twice may be read by accelerometers within the cell phone 104 which may generate a signal to unlock the doors of the vehicle 106. Any number of command signals or data may be generated by the cell phone 104 in response to receiving the user input. Alternatively, the cell phone 104 may simply pass the user input to the vehicle 106 to interpret and implement the commands.

In another embodiment, pressing a key sequence, such as 1, 2, 3 may start the engine of the vehicle and an additional sequence of 1, 2, 5 may unlock the trunk of the vehicle 106. The cell phone 104 may require an identifier to authenticate that the user 102 is authorized to control the vehicle 106. For example a password, user name, voice identifier, or biometric may be required to be input or read by the cell phone 104 before the commands or wireless signals are transmitted from the cell phone 104 to the vehicle 106 or authenticated by the vehicle 106.

In another embodiment, the vehicle 106 may be configured to perform certain actions or tasks based on a specific action taken by the user 102. For example, the user 102 may be required to scan the cell phone 104 utilizing the transceiver of the vehicle 106. The scan may be performed at a specified distance from the vehicle 106. For example, a radio frequency identification tag (RFID), cell phone number, account number, or other identifier may be read by the vehicle 106. Many users store their cell phones or other electronic communications devices at a location that is sometimes difficult to access. For example, the user 102 may store the cell phone 104 in a front pocket, a purse, a business bag, or at another location that may be difficult to quickly access. The illustrative embodiments may allow the user 102 to passively control features and functions of the vehicle 106 possibly based on a determined distance and/or direction of travel. The systems of the vehicle 106 may also be controlled actively based on user input or another user action. Alternatively, a combination of passive and active measurements may be utilized to verify and initiate the actions as herein described.

Figure 2:
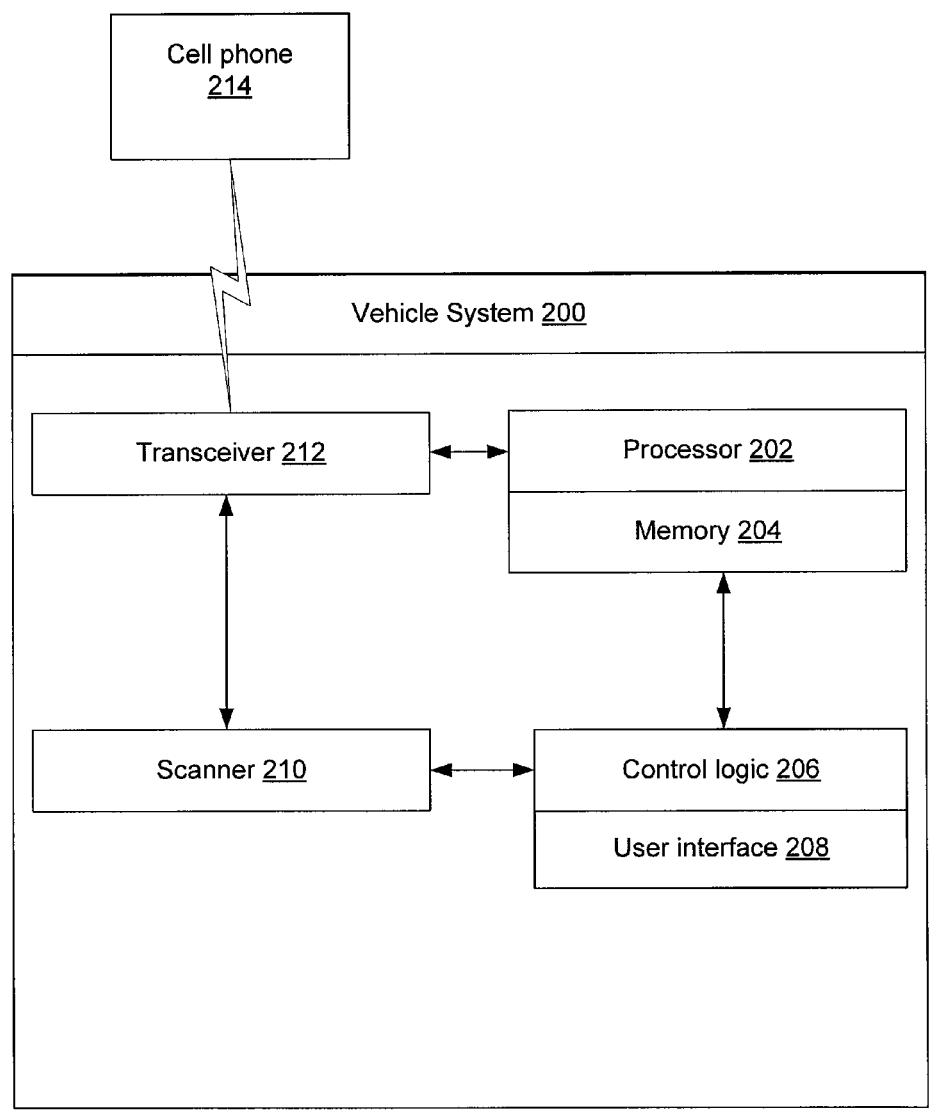
FIG. 2 is a block diagram of a cell phone and vehicle system in accordance with an illustrative embodiment.

FIG. 2 is a block diagram of a cell phone and vehicle system in accordance with an illustrative embodiment. The vehicle system 200 is the computing and communications element of the vehicle. The vehicle system 200 is a particular implementation of the integrated or discreet components of the vehicle 106 of FIG. 1. In one embodiment, the vehicle system 200 may include any number of components, including a processor 202, a memory 204, a control logic 206, a user interface 208, a scanner 210, and a transceiver 212. The vehicle system 200, and more particularly, the transceiver 212 may further communicate with the cell phone 214 which is a particular implementation of the cell phone 104 of FIG. 1. The cell phone 214 may further include the elements and components of the vehicle system 200 as herein described. In one embodiment, the cell phone 214 includes an application that may be selected or run as a background application to communicate with the vehicle system 200 and perform any number of tasks as herein described.

The processor 202 is circuitry or logic enabled to control execution of a set of instructions. The processor 202 may be a microprocessor, digital signal processor, central processing unit or other device suitable for controlling an electronic device including one or more hardware and software elements, executing software, instructions, programs and applications, converting and processing signals and information, and performing other related tasks. The processor 202 may be a single chip or integrated with other computing or communications elements. The processor 202 may also execute a set of software modules to initiate communication with a vehicle verify the identity of a user, send commands to the vehicle, and receive status updates.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or other storage suitable for recording data, instructions, and information. In one embodiment, the memory 204 and processor 202 may be integrated. The memory may use any type of volatile or non-volatile storage techniques and mediums. The memory 204 may include hardware or software for implementing voice commands and voice recognition. In one embodiment, the memory 204 may store user preferences, settings, and configurations. For example, the memory 204 may store access information for one or more cell phones, commands for each cell phone, distance thresholds and actions associated with each threshold, and other information, data and settings for controlling the vehicles' systems. The memory 204 may further include a database for storing information associated with one or more cell phones and users.

In one embodiment, the vehicle system 200, and particularly, the processor 202 may execute a set of instructions stored in the memory 204 in order to implement the features and methods of an embodiment, as herein described. In another embodiment, the control logic 206 may include hardware or software settings that perform an illustrative embodiment.

The user interface 208 is the interface elements for receiving user input and selections and displaying information to the user. For example, the user interface 208 may include an LCD touch screen that may be utilized to configure user preferences for controlling the distinct features and systems managed by the vehicle system 200 based on information scanned and actively received through the cell phone 214. The user interface 208 may be integrated with a display for the GPS, stereo, environmental controls, or other independent systems managed by the vehicle system 200. The user interface 208 may include the other controls or systems for managing systems of the vehicle which may include the stereo, entertainment system, temperature controls, driving controls, and other elements of the vehicle. In another embodiment in which the user interface 208 is for the cell phone 214 any number of buttons, icons, track ball, touch screen, soft keys, scroll wheels, or other similar interface elements may be included or programmed to implement specific commands or features.

The control logic 206 is the logic for controlling the vehicle system 200. For example, the control logic 206 may be discrete logic elements, an integrated circuit, programmable logic, application logic, or other logic systems, devices, or elements for controlling the vehicle system 200. The control logic 206 may be configured to determine a distance between the vehicle system 200 and the cell phone 214. In addition, the control logic 206 may determine whether the cell phone 214 is approaching the vehicle system 200 or becoming further separated from the vehicle system 200. The determination of distance may be made utilizing global positioning information from the cell phone 214. In another embodiment, a signal strength read by the vehicle system 200 or the transceiver 212 may indicate an approximate distance between the vehicle system 200 and the cell phone 214. A subsequent measurement or series of measurements may be utilized to determine whether the cell phone 214 is nearing or leaving the vehicle system 200. The control logic 206 may be configured to take any number of actions based on the distance measurement.

In one embodiment, one or more threshold distances or thresholds may be utilized to perform an associated action. The threshold is a pre-set level, range, or distance at which a specified action is configured to occur. For example, the user may set options settings or configurations that are stored in the memory 204. The options may include the thresholds that are used by the control logic 206 to pick any number of actions. For example, when the cell phone 214 is determined to be within 50 feet of the vehicle system 200 and approaching the vehicle system 200, the control logic 206 may turn on the lights of the vehicle. At 10 feet, the control logic 206 may further unlock the driver's door and at 5 feet the vehicle system 200 may pop the trunk of the vehicle based on a number of threshold distances at 50, 10 and 5 feet. As described, the determination of the distance between the cell phone 214 and the vehicle system 200 may be performed by either device or by communications between both devices.

In another embodiment, the control logic 206 may verify an identifier, user input, selection or command received for the cell phone 214. For example, the control logic 206 may receive a key sequence of 1, 2, 3 to unlock the door to the vehicle. The control logic 106 may convert the user selection or command into signals that the vehicle system 200 may utilize to control integrated or discrete elements within the vehicle.

In another embodiment, the control logic 206 may verify a user's voice received in a wireless transmission from the cell phone 214 to the transceiver 212 utilizing voice recognition. The vehicle system 200 may be set to require the user to say his or her name before granting access to the vehicle system 200. In another embodiment, the control logic 206 may verify an encrypted key, biometric, or password sent to the transceiver 212 by the cell phone 214. The commands or user input received from the cell phone 214 may be verbal, tactile, or based on a collection of buttons or a series of buttons on the cell phone 214. The control logic 206 may convert the signal as received to command or control the systems of the vehicle.

In one embodiment, the control logic 206 may be configured to take additional actions based on other distances, time periods, or other settings. In one configuration, if the control logic 206 determines the cell phone 214 is within a specified distance threshold, but has not interacted with the vehicle system 200 within 30 seconds, the control logic 206 may send out a command to relock the doors, turn off the lights, and secure the trunk. The user interaction may be the user opening the door, touching the vehicle, speaking a voice command, or other interactions with the vehicle. As a result, the control logic 206 may ensure that the vehicle is secure at all times regardless of whether a false, unintentional, or inadvertent signal is received from the cell phone 214. For example, the user interaction may be the user opening the door, touching the vehicle, speaking a voice command, or other interactions with the vehicle.

The scanner 210 is a scanning device configured to read information, data, or a signal from the cell phone 214. In one embodiment, the scanner 214 is a radio frequency identification tag scanner that reads an RFID tag embedded in the cell phone 214. For example, the user may raise the cell phone 214 in front of the scanner 210 which may be imbedded or integrated within the driver's side door. The scanner 210 may read or scan the device or signal from the cell phone 214 to manage the vehicle system 200, as herein described. The scanner 210 may also read a SIM card or other device or identifier of the cell phone 214.

The transceiver 212 is a device operable to communicate with the cell phone 214. In addition, the transceiver 212 may also communicate with other systems or devices within the vehicle or that are part of the vehicle system 200. In one embodiment, the transceiver 212, scanner 210, control logic 206, and other elements of the vehicle system 200 may be further integrated. The vehicle system 200 may include any number of other systems, devices, and elements typically integrated or used within a vehicle.

In one embodiment, the transceiver 212 and the vehicle system 200 may simulate a base station used in wireless networks. The transceiver 212 may utilize the battery of the vehicle to send and receive signals as if the vehicle were an access point of a network. As a result, the cell phone 214 may register itself with the transceiver 212 as if the transceiver were a visitor location register, home location register, or similar element or device of a wireless network. The power level or quality of the signal received from the cell phone 214 may be utilized to determine a distance between the cell phone 214 and the vehicle.

Figure 3:
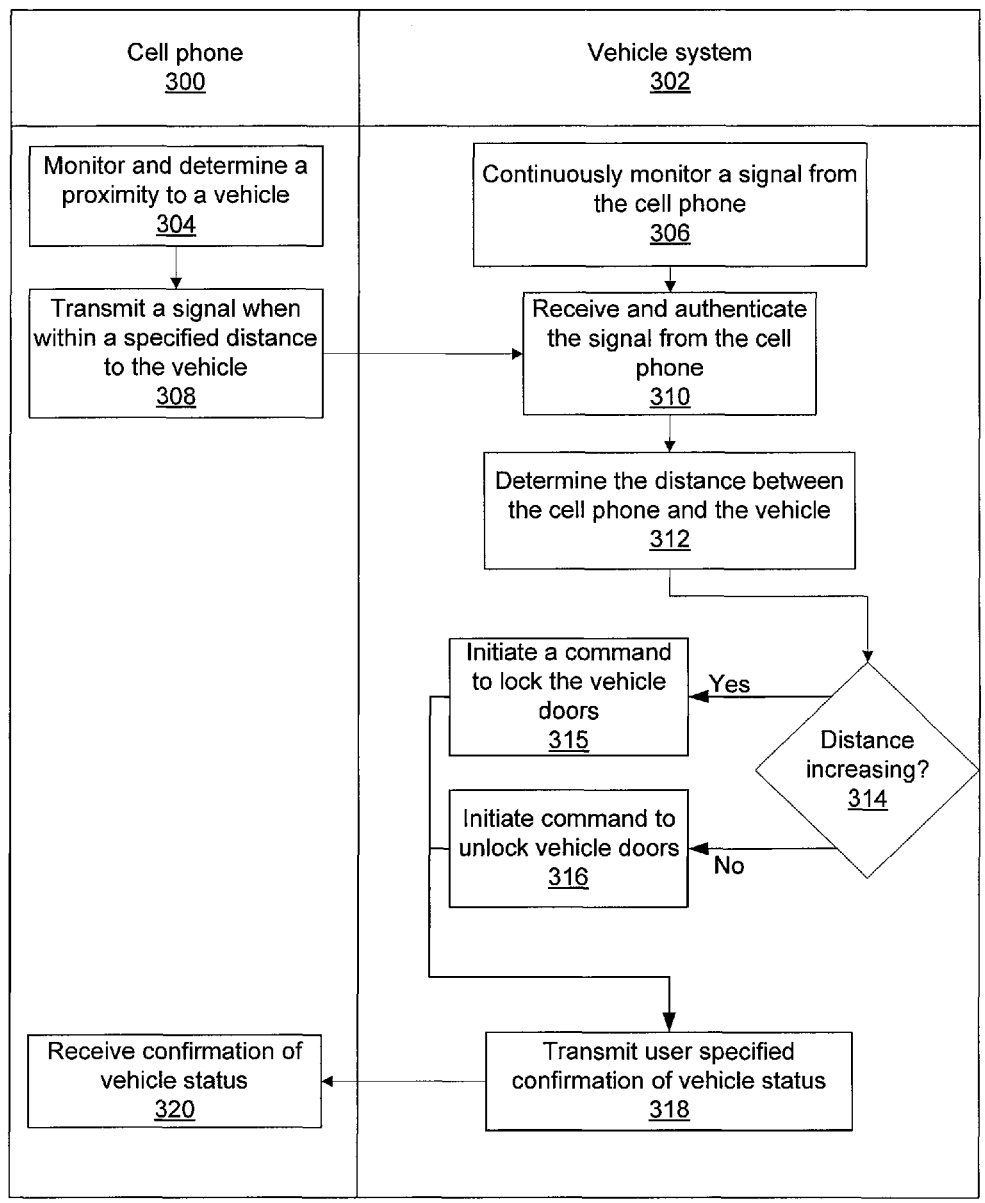
FIG. 3 is a flowchart of a process for controlling a vehicle system from a cell phone in accordance with an illustrative embodiment.

FIG. 3 is a flowchart of a process for controlling a vehicle system from a cell phone in accordance with an illustrative embodiment. The process of FIG. 3 may be implemented by a cell phone 300 and a vehicle system 302. The process may begin with the cell phone 300 monitoring and determining a proximity to a vehicle (step 304). In one embodiment, the cell phone may attempt to connect to the vehicle system 302 using one or more wireless signals at pre-determined time intervals or locations.

At the same time, the vehicle system 302 continuously monitors for a signal from the cell phone 300 (step 306). During step 306, the vehicle system 302 may poll or search for a link to the cell phone 300. Next, the cell phone 300 transmits a signal when within a specified distance of the vehicle (step 308). In one embodiment, the specified distance may be a distance at which communications may be reliably transmitted between the two devices. In another embodiment, the specified distance may be a distance threshold or threshold utilized by the cell phone 300 or the vehicle system 302 to take a specified action.

Next, the vehicle system 302 receives and authenticates the signal from the cell phone (step 310). As previously described, the signal may be a standard cellular signal utilized for voice and data communications. In another embodiment, the signal may be a short range signal, such as WiFi, WiMAX, or a Bluetooth, or other custom radio frequency signals that may be utilized to allow the cell phone 300 and the vehicle system 302 to communicate. The signal may be authenticated as if the cell phone were broadcasting to a transmission tower within a network operated by a communications service provider. The signal may be authenticated utilizing a username, password, biometric, or other similar identifiers.

In one embodiment, the cell phone 300 may not perform the actions of step 304 and 308. In particular, the cell phone 300 may simply transmit a signal that may be read by the vehicle system 302. As a result, the logic or steps utilized by the cell phone 300 may be significantly more simple. For example, the cell phone 300 may transmit the signal at predefined time periods, such as every 15 or 30 seconds to determine if the cell phone 300 is within communications range of the vehicle system 302.

Next, the vehicle system 302 determines the distance between the cell phone and the vehicle (step 312). Step 312 may be preformed continuously or any number of times once the cell phone 300 is detected by the vehicle system 302. As a result, multiple measurements or readings of the position of the cell phone 300 may be retrieved from global positioning measurements recorded by the cell phone 300 or based on a signal strength as determined by the vehicle system 302. For example, as the cell phone 300 gets closer to the vehicle system 302, the signal strength will increase. The changes in signal strength may be converted to distance measurements based on pre-configured settings, calibrations, and tests.

Next, the vehicle system 302 determines whether the distance is increasing (step 315). The determination of step 315 may be made on the measurements made in step 312 and recorded by the vehicle system 302. If the distance is determined to be increasing, the vehicle system 302 initiates a command to lock the vehicle doors (step 314). Step 314 is performed because the user and the associated cell phone 300 are increasing their distance between the vehicle system 302 and as a result, the user is probably entering his or her home, place of business, work, or other location where the user must be separated from the vehicle. As a result, the doors are locked in order to secure the vehicle regardless of whether the user has affirmatively selected to lock the doors.

If the distance is not increasing in step 314, or in other words, if the distance is decreasing, the vehicle system 302 initiates a command to unlock the vehicle doors (step 316). The doors may be unlocked based on a threshold distance or once the cell phone 300 has detected the vehicle system 302. For example, most Bluetooth signals are only detectable up to 30-50 feet and as a result, the vehicle system 302 may unlock the vehicle doors in response to detecting the Bluetooth signal from the cell phone 300.

Next, the vehicle system 302 transmits a user specified confirmation of vehicle status (step 318). The user may configure the vehicle system 302 to transmit a status indicating the vehicle has been locked or unlocked during steps 315 and 316. In another embodiment, the user may configure the vehicle system 302 not to send a status update to the cell phone 300. The status update may be sent through one or more communications networks. For example, once the cell phone 300 is out of range of the vehicle system 302 a test message may be sent from the vehicle system 302 to the vehicle. The status updates may be sent based on user preferences and may provide additional security information to one or more users. The examples of unlocking and locking doors given in steps 315 and 316 are given as examples only. The vehicle system 302 may similarly control other systems and features of the vehicle, such as environmental controls, engine start and stop, window controls, power trunk or gate control, or other similar systems of the vehicle.

Next, the cell phone 300 receives confirmation of the vehicle status (step 320). For example, a simple message displayed on the screen of the cell phone may indicate vehicle locked, or a single vibration or chime may indicate that the trunk has been opened in response to the user approaching the vehicle with the cell phone 300.

Figure 4:
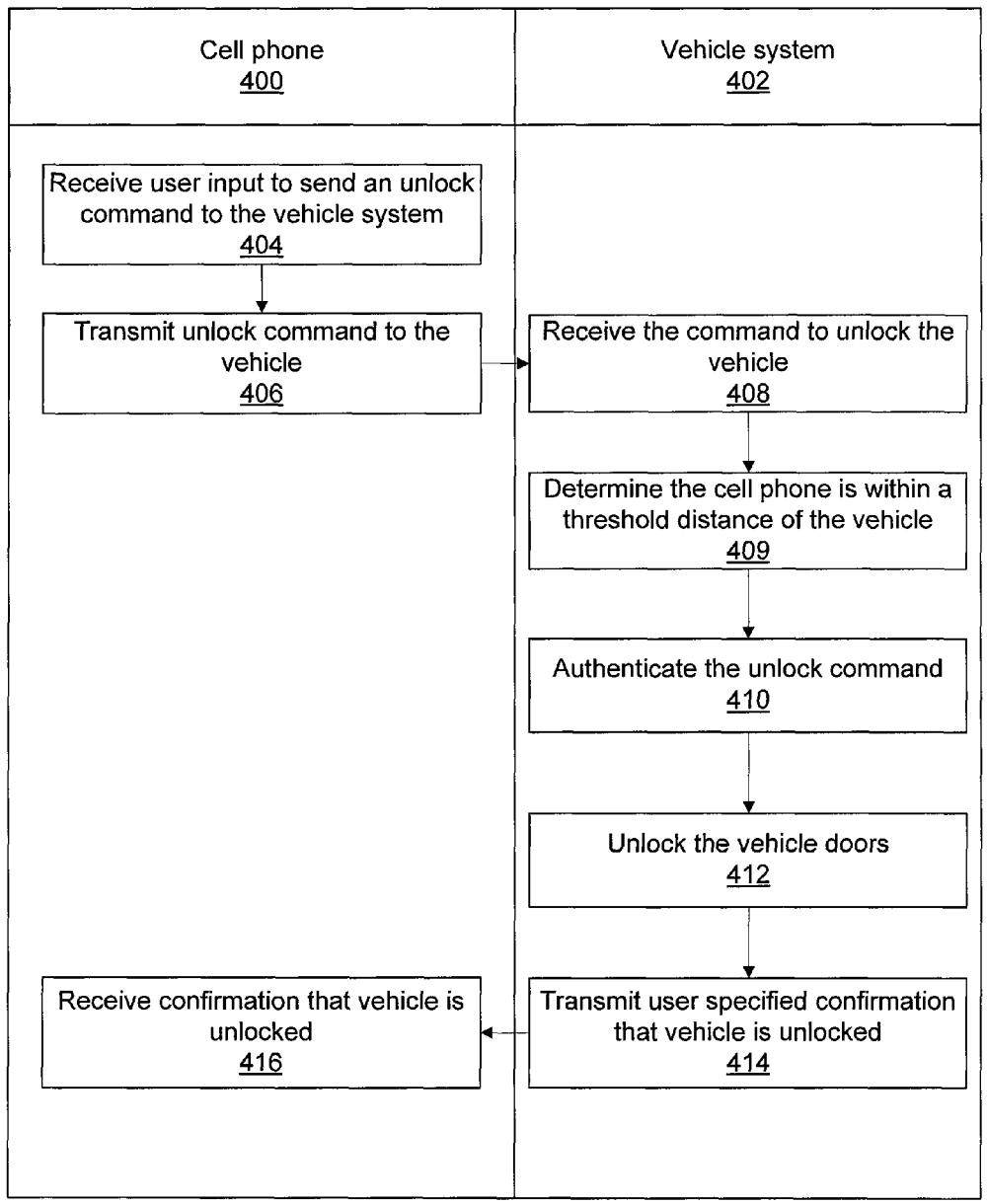
FIG. 4 is a flowchart of a process for unlocking a vehicle in accordance with an illustrative embodiment.

FIG. 4 is a flowchart of a process for unlocking a vehicle in accordance with an illustrative embodiment. The process of FIG. 4 may be implemented by a cell phone 400 and a vehicle system 402. The process may begin with the cell phone 400 receiving user input to send an unlock command to the vehicle system (step 404). The user input of step 404 may be a specified motion, such as waving the cell phone 400 in a specified pattern that may be converted into a command by accelerometers within the cell phone. In another embodiment, the user may provide tactile input by tapping or rubbing the cell phone 400. The user may also enter a button sequence or press a dedicated hard key or soft key of the cell phone 400. Any number of user inputs or selections may be utilized to initiate the unlock command.

Next, the cell phone 400 transmits the unlock command to the vehicle (step 406). The vehicle system 402 receives the command to unlock the vehicle (step 408). Next, the vehicle system 402 determines the cell phone is within a distance threshold to the vehicle (step 409). The determination of step 409 may be made based on GPS information, wireless triangulation, a signal strength of the links between the cell phone 400 and the vehicle system 402, or utilizing any number of other signals or data available to the cell phone 400 and the vehicle system 402. Next, the vehicle system 402 authenticates the unlock command (step 410). The unlock command may be authenticated by utilizing a biometric that is scanned or read by the cell phone 400, such as a finger print, iris reading, blood type confirmation, DNA analysis or other information that may be easily retrieved from the user. The unlock command may also be verified using a username, password, pin number, nickname, or similar authentication information.

In another embodiment, a hardware or software identifier associated with the cell phone 400 may be utilized to authenticate the unlock command. For example, the cell phone 400 may record a voice sample and send a cell phone thin number to the vehicle system 402 for voice match identification and identification of the thin number. Next, the vehicle system 402 unlocks the vehicle door (step 412). As previously described, the unlock command may be associated with any number of tasks, such as turning on the vehicle, turning on the air conditioning, reconfiguring the seats based on a user associated with the cell phone, unrolling windows, deactivating the alarm system, or otherwise, prepare the vehicle for utilization.

Next, the vehicle system 402 transmits a user specified confirmation that the vehicle is unlocked (step 414). The cell phone 400 receives the confirmation that the vehicle is unlocked (step 416). The confirmation may be a ring tone, voice response indicating the door is unlocked, or other feed back to the user of the cell phone 400. Although, unlocking the doors is described with regard to FIG. 4, any number of other tasks including, locking the doors, starting the engine, adjusting a seat, turning on a stereo or entertainment center, turning on the air conditioner, lowering the windows, or adjusting other feature systems or devices within the vehicle may be similarly utilized.

FIG. 5 is a pictorial representation of a GUI 500 in accordance with an illustrative embodiment. The GUI 500 is one embodiment of a user interface that may be displayed to a user through the display of vehicle systems or on a cell phone. The GUI 500 may allow the user to configure and control the different features and elements managed by the vehicle control systems. The GUI 500 may include any number of interactive elements, including selection elements 502-528. The selection elements may be portions of a touch screen, buttons, or other elements that the user may touch, press, select or activate to provide user input through the GUI 500. In one embodiment, the GUI 500 may be displayed on an internal or external navigation system, a media interface, or environmental and operation controls of the vehicle.

In one embodiment, the selection element 502 may allow a user to specify a number of vehicles that may be controlled through a selected cell phone or other wireless device. The selection element 504 may allow a user to specify an activation distance or threshold distance. The threshold distance may be utilized to determine when and where an action is performed within the vehicle. For example, at 30 feet, the doors may be locked or unlocked depending on whether the cell phone utilized by the user is approaching or separating itself from the vehicle.

The selection element 506 may allow a user to add or link a vehicle and a cell phone. For example, if the GUI 500 is an interface for the cell phone, the user may link or associate the cell phone with one or more vehicles utilizing an active synchronization or link feature available through the GUI 500. The selection element 508 may display those vehicles that are active for communication with the cell phone.

The selection elements 510-526 may link a specific action with a user input or logic determination made by the cell phone. For example, the selection element 510 may determine when and how to lock the doors of a truck and van associated with the cell phone. The truck may be locked by double tapping the cell phone, whereas, the van may automatically be locked based on a proximity detection. For example, the van may be locked once the cell phone is within 30 feet of the van. The selection element 512 may unlock the truck in response to a double tap of the cell phone. The van may be unlocked by a double tap and a proximity detection. In other words, once the cell phone is within 30 feet and the user double taps the cell phone, the van may be unlocked. The selection element 514 may allow the van to be unlocked by pressing the key sequence "99".

The selection element 526 may specify how and when the user receives notification of actions occurring within the vehicle, such as the engine being started or unlocked. In one embodiment, a cellular network may be utilized to broadcast the information to the cell phone regardless of the location of the cell phone. The selection element 528 may specify a time period for securing the vehicle. For example, if the user has left the vehicle for thirty seconds and no one is within the vehicle, the doors may be locked and all systems may be shut down. The vehicle may include various safeties, including motion or sound detectors to ensure that vehicles' systems remain active if a child or other individual is accidentally left in the vehicle. The vehicle system may even reactivate any number of systems including the engine, air conditioning, and an alarm in response to determining conditions in the vehicle are not safe for people or animals that may still be in the vehicle.

FIG. 6 is a pictorial representation of a user interface 600 for a cell phone in accordance with an illustrative embodiment. The user interface 600 is one embodiment of a display, GUI, touch screen, or other interactive interface or information that may be displayed to a user utilizing a cell phone to communicate with a vehicle. In one embodiment, the cell phone may be configured to send commands to the vehicle system. For example, the cell phone may store the commands, options, user preferences, or other information that control the vehicle system. As a result, the vehicle system may only take action based on commands or signals received from the cell phone. In another embodiment, the user interface 600 may be displayed by the vehicle system for similarly reconfiguring the user preferences, settings, and information utilized to perform the features and functions herein described.

FIGS. 6 and 7 illustrate different user interfaces that may be utilized to pre-configure the communications, commands, and features implemented between the cell phone and the vehicle system. The examples and descriptions shown and illustrated in FIGS. 6 and 7 are only examples of some commands, criteria, and parameters that the user may set. In one embodiment, the user interface may include sections 602-610. In particular, the sections 602-610 may include any number of icons, buttons, selection elements, drop down lists, menus, or other interactive features. In one embodiment, any number of screens or separate menu lists may be displayed to a user based on the user selections. The sections 602-610 may allow a user to specify proximity selections, voice commands, programming, media selections, environment selections, and priority selections, respectively. The sections 602-610 may allow one or more users to enter specific information, including threshold distances, commands, custom commands, temperature, and other information that may be utilized to customize the communications and functions of the cell phone and vehicle systems. Distinct configurations of the user interface 600 may be associated with one or more user profiles. Additionally, the user interface 600 may display default settings of the cell phone and vehicle system.

Section 602 may allow the user to specify the commands sent from the cell phone to the vehicle system based on the distance between the cell phone and the vehicle system. For example, for Jane, a user, the user interface 600 may allow her to specify that at forty feet, actions, such as adjusting the seat and mirrors and turning on the lights, occur. The user may select any number of commands that are implemented at threshold distances by selecting commands or entering values. In one embodiment, the sections 602-610 may include a number of default commands that may be implemented based on the make and model of the vehicle. For example, Jane may further configure the cell phone utilizing section 602 to send commands to unlock the driver's side door and rear door and open a sliding door at ten feet (not all vehicles may include a sliding door). Additionally, the user may specify a distance at which the vehicle is locked and a security/anti-theft system activated in response to determining the cell phone is becoming further separated from the vehicle. In another embodiment, the user may specify that the vehicle lights are to remain on until the cell phone is 100 feet from the vehicle or for 90 seconds, whichever occurs sooner.

Section 604 may allow the user to program voice commands. For example, specific voice commands may be linked with actions taken by the vehicle system. A generic command, such as "unlock all", may be configured to unlock all the doors in the vehicle. A command such as "total unlock" may be configured to unlock all the doors and disengage the lock or latch of the trunk. The voice command programming of section 604 may allow a user to speak voice commands that are recognized by the cell phone and converted into control or command signals that are implemented by the vehicle system. Section 604 may include any number of default commands that may be utilized by the user and associated with specific voice commands. Alternatively, the user may enter custom commands and associate these commands with specified speech.

Section 606 may allow a user to specify the media selections for the vehicle. The media selections, as well as the commands, criteria, and conditions of sections 608 and 610 may occur at a specific distance, based on a command, by default, based on conditions, or based on a combination of active and passive feedback. For example, the radio may be turned to a first country music station in response to the user opening the driver's side door. In other embodiments, the user may select other actions or criteria for implementing the commands and features of sections 602-610. For example, a rear television in a vehicle may only be activated if a secondary or sliding door is opened.

Section 608 may allow a user to specify environmental selections, such as commands to implement if rain is detected by the cell phone or vehicle systems. Additionally, the section 608 may allow a user to specify temperatures for one or more portions of the vehicle. For example, if the temperature is less than 64° the heater may be turned on and a integrated heater of the seat may be activated temporarily. Similarly, based on the systems available in the vehicle, a retractable top, sun roof, moon roof, or windows may be completely or partially opened under specified conditions. In one embodiment, the information from the cell phone, such as current weather conditions, may be linked with commands that are transmitted from the cell phone to the vehicle system.

Section 610 may be utilized to specify a priority if one or more cell phones linked with the vehicle system approach simultaneously. For example, if Jane and Fred approach the vehicle at the same time, Jane's preferences and commands may take precedence over those of Fred. The driver's side seat may be adjusted to setting "2" rather than setting "1" utilized by Fred. The priority selections of section 610 may be prioritized by the user or based on specific commands or configurations of the sections 602-608. The user interface of 600 illustrates many other commands and configurations that may also be utilized between the cell phone and vehicle system.

FIG. 7 is a pictorial representation of a user interface 700 in accordance with an illustrative embodiment. The user interface 700 is another embodiment of a display, screen, or other interactive feature. In one embodiment, the user interface 700 may display the selections previously made by another user utilizing an interface, such as user interface 600 of FIG. 6. For example, the user interface 700 may summarize the commands and selections implemented for a user named "Fred". In one embodiment, the user interface may include sections 702-710. The sections 702-710 may display the proximity options, program voice commands, media options, environment settings, and priority settings, respectively.

The settings, commands, and configurations illustrated in the user interface 700 may be displayed by the vehicle system or cell phone in various embodiments. In particular, the user interface 700 may include different preferences that are customized for Fred. Each user may have a different personality, physical characteristics, safety concerns, entertainment preferences, and other preferences that influence the interaction configured between the cell phone and the systems of the vehicle. The user may view the user interface 700 in order to review the configuration or as a reminder to give specific voice commands. Alternatively, the user interface 700 may be utilized to customize, adjust, or reconfigure the commands and implementation of the commands sent from the cell phone to the vehicle system or the actions independently performed by the vehicle system.

The previous detailed description is of a small number of embodiments for implementing the invention and is not intended to be limiting in scope. The following claims set forth a number of the embodiments of the invention disclosed with greater particularity.

What is claimed is:

1. A method for controlling systems of a vehicle with a cell phone, the method comprising:
   displaying, with a user interface, a plurality of vehicles that are in active communication with the cell phone;
   receiving a selection of one of the plurality of vehicles through the user interface;
   associating the cell phone with the selected vehicle through the user interface;
   receiving user preferences through the user interface for sending commands from the cell phone to the vehicle for controlling the systems of the vehicle, wherein the user interface enables a user to customize, adjust, or reconfigure the commands;
   establishing a wireless connection between the vehicle and the cell phone;
   determining a distance between the cell phone and the vehicle;
   sending, with the cell phone, a plurality of commands to the vehicle to control the systems based on the user preferences;
   receiving, with the cell phone, a plurality of status messages from the vehicle, in response to the plurality of commands; and
   displaying, with the cell phone, a status of the vehicle, the status being based on at least one of the plurality of status messages.

2. The method according to claim 1, wherein the cell phone is associated with the plurality of vehicles through the user interface.

3. The method according to claim 1, further comprising authenticating the cell phone.

4. The method according to claim 2, wherein the sending is performed in response to a user selection utilizing the user interface.

5. The method according to claim 4, wherein the sending is performed in response to a user selection and the distance reaching a threshold.

6. The method according to claim 4, wherein the wireless connection is any of a WiFi, Bluetooth, and cell phone connection.

7. The method according to claim 4, wherein the user selection is any of tactile feedback to the cell phone, one or more keyed entries on the cell phone by a user, and a voice command converted to the one or more of the commands.

8. The method according to claim 1, further comprising:
   securing the vehicle in response to a user not interacting with the vehicle within a time period.

9. The method according to claim 1, further comprising:
   locking and unlocking the vehicle in response to determining the distance is at a threshold.

10. The method according to claim 1, further comprising:
    associating the voice command with one or more of the commands.

11. The method according to claim 1, further comprising:
    prioritizing commands received from a plurality of cell phones based on the user preferences; and
    displaying a status of the vehicle to the cell phone.

12. The method according to claim 11, wherein the prioritizing is performed based on a user profile associated with the plurality of cell phones.

13. The method according to claim 1, wherein commands control a plurality of systems within the vehicle including lock control, light control, temperature controls, engine start and stop control, entertainment system, trunk control, environmental control, and seat configuration.

14. A cell phone for controlling systems of a vehicle, the cell phone comprising:
    a transceiver configured to wirelessly communicate with a vehicle system, the transceiver further configured to determine a distance between the cell phone and the vehicle system;
    a user interface in communication with the transceiver, the user interface configured to display a plurality of vehicles that are in active communication with the cell phone; the user interface configured to receive user input to select one of the plurality of vehicles and to associate the selected vehicle with the cell phone, the user interface further configured to receive user preferences linking a plurality of commands with one or more actions of the vehicle system, the user interface further configured to enable a user to customize, adjust, or reconfigure the commands; and
    control logic in communication with the user interface configured to convert the user input to one of the one or more commands, wherein the transceiver communicates the plurality of commands to the vehicle system to control the systems of the vehicle and to receive a plurality of status messages from the vehicle in response to the plurality of commands, and wherein the user interface displays a status of the vehicle, the status being based on at least one of the plurality of status messages.

15. The cell phone according to claim 14, wherein the user input is any of tactile feedback to the cell phone, one or more keyed entries on the cell phone by a user, and a voice command.

16. The cell phone according to claim 14, wherein the control logic is operable to transmit one of the one or more commands to the vehicle system in response to determining the distance is within a threshold with or without the user input.

17. The cell phone according to claim 14, wherein the cell phone is associated with the plurality of vehicles for controlling vehicle systems of the plurality of vehicles, and wherein the control logic prioritizes commands transmitted from a plurality of cell phones simultaneously based on the user preferences.

18. The cell phone according to claim 14, wherein the control logic requests an identifier for authenticating the user before transmitting the one or more commands to the vehicle system.

19. A cell phone for controlling a vehicle system, the cell phone comprising:
    a processor for executing a set of instructions; and
    a memory for storing the set of instructions, wherein the set of instructions are configured when executed by the processor to:
        display, with a user interface, a plurality of vehicles that are active in communication with the cell phone;
        receive a selection of a vehicle through the user interface;
        associate the cell phone with the selected vehicle through the user interface;
        receive user preferences through the user interface for sending commands from the cell phone to the vehicle for controlling systems of the vehicle, wherein the user interface enables a user to customize, adjust, or reconfigure the commands;
        establish a wireless connection between the vehicle and the cell phone;
        determine a distance between the cell phone and the vehicle;
        send a plurality of commands to the vehicle to control the systems based on the user preferences;
        receive a plurality of status messages, in response to the plurality of commands; and
        display a status of the vehicle to the user interface of the cell phone, the status being based on at least one of the plurality of status messages.

20. The cell phone according to claim 19, wherein the set of instructions further:
    configures the vehicle system for a user in response to determining the distance is within a threshold.

\* \* \* \* \*